United States Patent [19]

Possati

[11] 4,356,634

[45] Nov. 2, 1982

[54] GAUGE FOR CHECKING GEOMETRICAL LINEAR DIMENSIONS OF MECHANICAL PIECES

[76] Inventor: Mario Possati, 40125 Viale Carducci, 23 Bologna, Italy

[21] Appl. No.: 201,222

[22] Filed: Oct. 27, 1980

[30] Foreign Application Priority Data

Oct. 29, 1979 [IT] Italy ................................. 3528 A/79
Jul. 22, 1980 [IT] Italy ................................. 3476 A/80

[51] Int. Cl.³ .............................................. G01B 7/02
[52] U.S. Cl. .................................. 33/169 R; 33/172 E
[58] Field of Search .......... 33/172 E, 172 BR, 174 L, 33/174 P, 148 R, 148 H, 149 J, 178 E, 178 R, 169 R; 73/105

[56] References Cited

U.S. PATENT DOCUMENTS 3,123,943 3/1964 Horch et al. .................... 33/174 L
3,958,338 5/1976 Anichini et al. .............. 33/143 L X

FOREIGN PATENT DOCUMENTS 343613 2/1931 United Kingdom .
982609 2/1965 United Kingdom .
1053984 1/1967 United Kingdom .
1401034 7/1975 United Kingdom .
1531209 11/1978 United Kingdom .

Primary Examiner—Harry N. Haroian

[57] ABSTRACT

A gauge including an outer tubular casing that houses a gauging armset having a movable arm with a feeler adapted to touch the piece to be checked. An element of the armset is clamped to a wall of the casing by means of rivets.

The gauge can be fixed to a support by means of connection screws coupled to the rivets.

20 Claims, 7 Drawing Figures

GAUGE FOR CHECKING GEOMETRICAL LINEAR DIMENSIONS OF MECHANICAL PIECES

The present invention relates to a gauge for checking geometrical linear dimensions of mechanical pieces, with an outer casing with walls to define an internal chamber; an armset fixed to the outer casing, the armset including a movable arm and a feeler, supported by the movable arm, adapted to touch the piece to be checked; and connection means to couple the gauge to an external support.

In the known gauges for checking linear dimensions of mechanical pieces there occur, in some applications, inconveniences that are due to excessive layour dimensions of the gauge and of the elements that serve to couple it to supports in the required position. Other drawbacks consist in the large number of elements that form the gauge, thus giving rise to high manufacturing and assembly costs.

An object of the invention is to provide a gauge that has a particularly simple structure, with small layout dimensions and allows reduction the manufacturing, assembly and repair costs of the gauge.

A further object of the invention is to provide a gauge that can be clamped in a cheap and steady way to an external support and wherein the clamping forces do not deform in a substantial way the gauge's outer casing.

These and other objects and advantages are obtained through a gauge of the type outlined at the beginning of this description wherein, according to the invention, the gauge further comprises elements adapted to lock the armset to the casing and to cooperate with the connection means to allow the coupling of the gauge to the support.

The invention is now described in detail with reference to the accompanying drawings, given by way of non-limiting example, wherein same or equivalent parts are indicated with the same reference numbers, and in which.

Figure 1:
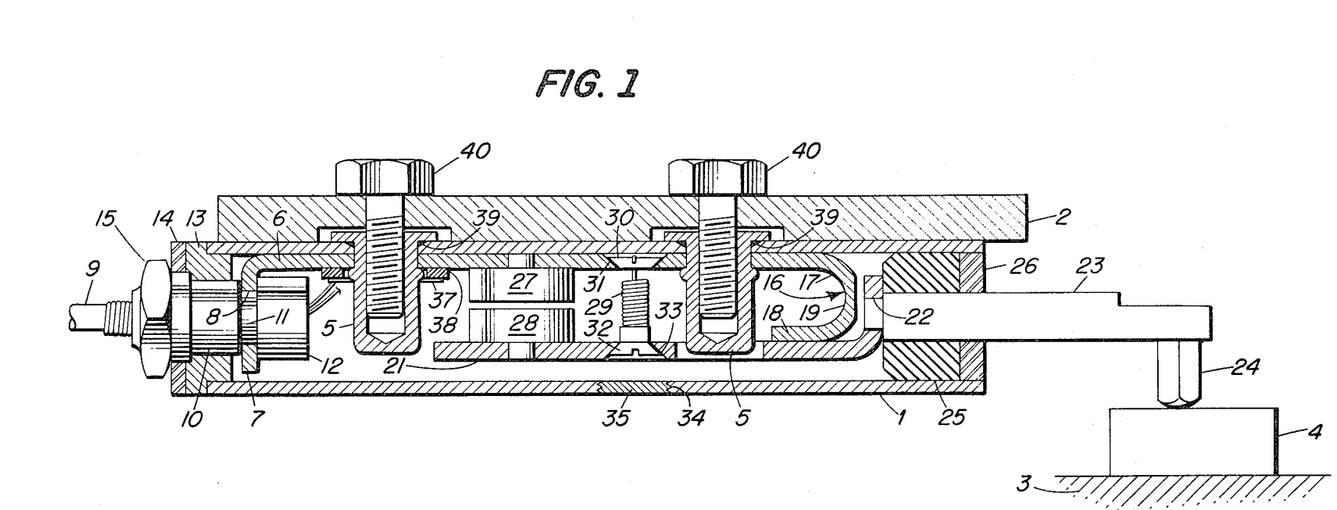
FIG. 1 is a vertical longitudinal section view of a gauge for checking linear dimensions of mechanical pieces, according to a first embodiment of the invention.
Figure 2:
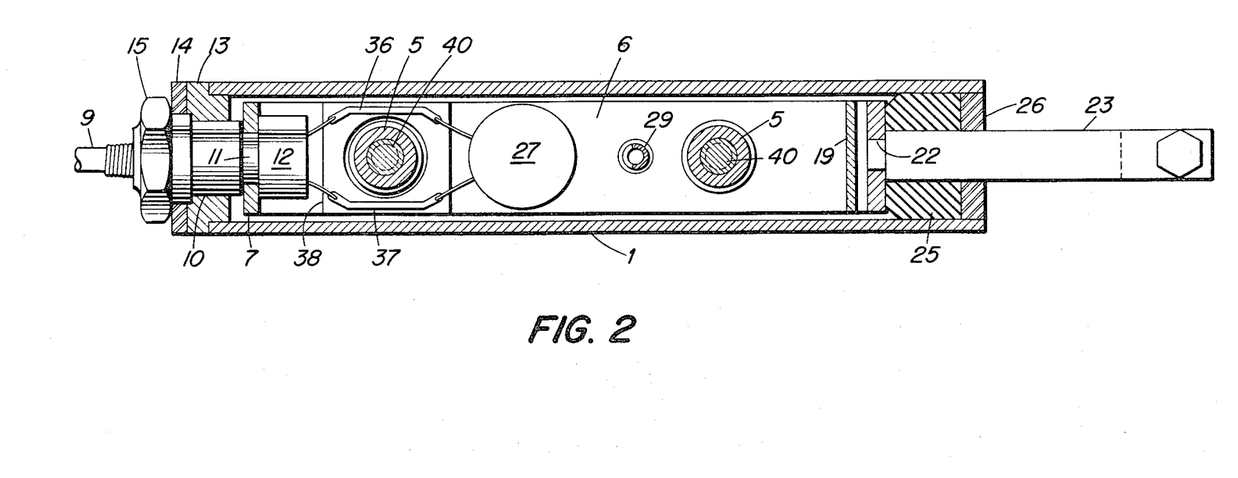
FIG. 2 is a horizontal longitudinal section view of the gauge shown in FIG. 1.

The gauge shown in FIGS. 1 and 2 includes an outer casing consisting of a single tubular element, or sheet steel tube 1, open at its ends and with cross-sections that have an outer and inner square perimeter. The internal faces of tube 1 are machined by a broaching machine in such a way as to be perfectly plane and parallel two by two.

Tube 1 is clamped, in a way that will be described hereinafter, to a support 2 fixed to a base 3 whereupon there is arranged a piece 4 the height of which has to be checked or, more precisely, the height deviation from a nominal value.

To the upper inner wall (FIG. 1) of tube 1 there is clamped by means of two threaded blind hole rivets 5, a longitudinal flat element 6 the width of which is slightly smaller than that of the wall. Element 6 ends at one end with a wing 7 that extends in a transversal direction with respect to the geometrical axis of tube 1.

Wing 7 has a hole 8 for the passage of an electric cable 9. Cable 9 is housed in a sleeve 10, externally threaded and has a portion 11 inserted in hole 8 of wing 7. To portion 11 is connected a member 12 providing a seat for housing a tear-resisting knot of cable 9.

A threaded cap 13 closes the end of tube 1. Cap 13 has a hole for housing sleeve 10. The sealing is ensured by a resilient gasket 14 that is compressed against the external face of cap 13 by a nut 15.

At the other end of element 6 there is another wing 16 that forms, together with element 6 and wing 7, a single piece of bent sheet steel for spring.

Wing 16 includes a first portion 17 that extends in a transversal direction and a second portion 18 that extends in a substantially axial direction. The first portion 17 has a section 19 of considerably smaller thickness making section 19 resiliently flexible so as to act as a fulcrum.

To the second portion 18 there is welded, by means of lateral seams, an L-shaped element 21 made of flat sheet steel, whose width is identical to that of element 6.

The long leg of the "L" extends in a substantially axial direction with respect to tube 1 while the short leg of the "L" extends in a substantially transversal direction.

There is a hole 22 in the short leg of element 21 wherein there is fixed an end of a cylindrical arm 23, that carries at its other end a feeler element 24 including a threaded stem screwed to a hole of arm 23 and a feeler for contacting the surface of piece 4.

Element 6, element 21 and arm 23 form a single device that hereinafter will be termed as "armset".

At the short leg of element 21 tube 1 is sealed by means of a flexible rubber gasket 25 and a protective diaphragm 26 made of multicellular rubber. Gasket 25 and diaphragm 26 have holes for the passage of arm 23 and are adequately resilient to allow arm displacements consisting in rotational movements about section 19. Normally these movements are of a small amplitude and it can thus be assumed that feeler 24 substantially moves in a direction that is perpendicular to the longitudinal geometrical axis of tube 1.

The gauge shown in FIGS. 1 and 2 also includes an inductive position transducer of the so-called "pot-core" type that provides a measurement signal responsive to the position of arm 23 and consequently of the feeler. The first element, or "pot-core", 27, of the transducer contains an electrical winding and it is fixed to element 6, while the second element, or pot-core, 28, is coupled to element 21.

A spring 29 arranged between elements 6 and 21 has an end connected to a truncated cone support 30 housed in a seat 31 defined by element 6. The other end of spring 29 is connected to a screw 32 that has its head located in a seat 33 formed in element 21. The head of the screw 32 is accessible through a hole 34 in tube 1, that is sealed by a threaded cap 35.

In this way it is possible, by turning the head of screw 32, to adjust the tension of spring 29 and consequently the contact force that the feeler applies to the surface of the piece to be checked.

The wires of cable 9 and those of the transducer element 27 are connected to conductive areas 36 and 37 that consist of printed circuits on a board 38. Board 38 is fixed to element 6 and has a hole for the passage of one of rivets 5. For the passage of this rivet there are provided holes through element 6 and tube 1, while for the passage of the second rivet 5 there are provided holes through tube 1, element 6 and element 21.

The moving of feeler 24 towards piece 4 is delimited by the contacting of the two pot-cores 27 and 28 while in the opposite direction feeler 24 is delimited by the contacting of the end of element 21 with the lower wall of tube 1.

The shape of section 19 and the action of spring 29 are such as to cause, under rest conditions, the two elements 27 and 28 to contact each other and to bring the feeler to the position corresponding to the maximum displacement in a clockwise direction. In the course of measurement taking, the action of spring 29 ensures the appropriate amount of contact force applied by the feeler to the piece 4.

The distance of the feeler displacement line and of the axis of the transducer from section 19 are identical, which enable achieving a displacement of the feeler equal to that (in the opposite direction) of pot-core 28. Between the head of each rivet 5 and tube 1 there is a sealing ring 39.

The gauge can be clamped to support 2 by means of two screws 40 that are screwed in the internal threads of the two rivets 5.

In this way rivets 5, besides connecting element 6 with tube 1, i.e. the armset with the gauge casing, also allow the clamping of the latter to a support.

The gauge can be filled, through hole 35, with silicone fluid, or another suitable damping liquid.

Figure 3:
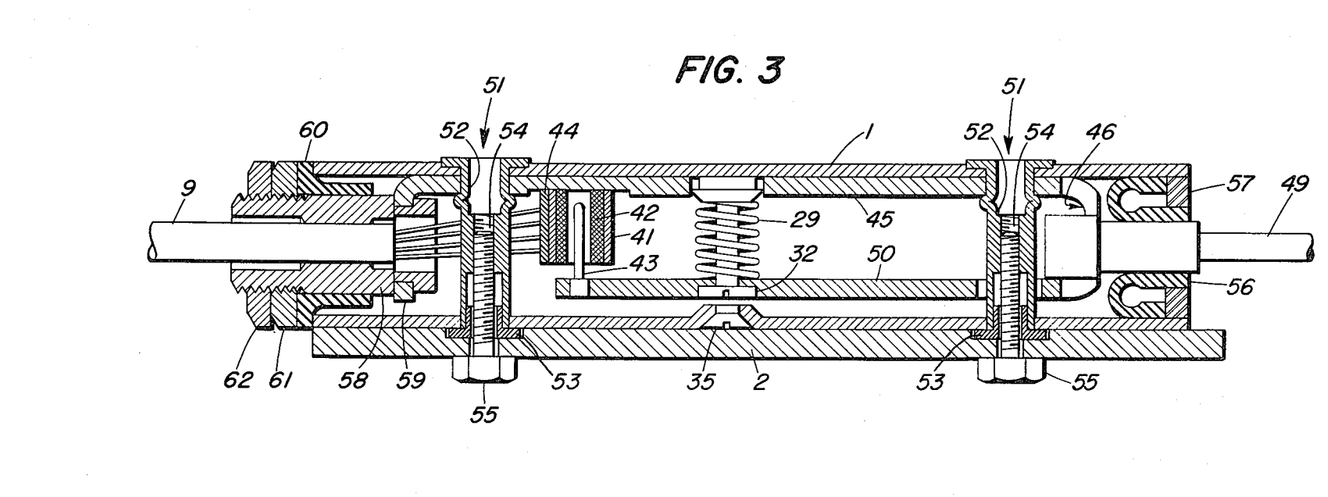
FIG. 3 is a vertical longitudinal section view of a gauge according to a second embodiment of the invention.
Figure 4:
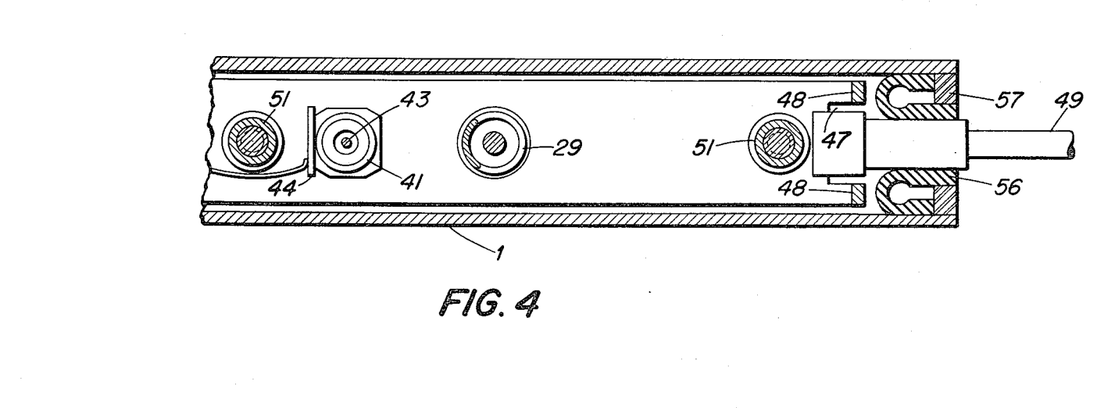
FIG. 4 shows partially a horizontal longitudinal section view of the gauge shown in FIG. 3.

The gauge shown in FIGS. 3 and 4 has some variants with respect to the one illustrated in FIGS. 1 and 2, mainly as far as the transducer, the movable armset and the connecting rivets are concerned.

There is foreseen the use of a differential-transformer position transducer, including a casing 41 with external plane faces, that houses the transformer windings 42, a movable core 43 and a printed circuit board 44 to which arrive the wires of cable 9 and those of the transducer. The transducer is of the type disclosed in Italian Patent Application No. 3365A/78 filed on Mar. 21, 1978, now available to public inspection.

With regard to the armset, instead of the two elements 6 and 21 of the gauge shown in FIGS. 1 and 2, there is provided a single element 45 made of flat sheet steel for spring, substantially bent to a U-shape. Element 45 has a transversal portion 46 with a hole 47. Portion 46 comprises two sections 48 of smaller thickness, that act as fulcrums. A square-sectioned or circular-sectioned arm 49 passes through hole 47 and is welded to the movable side of element 45.

Element 45 is fixed to a wall of tube 1 by means of two through hole threaded rivets 51. One of the two rivets 51 passes through two holes defined by opposite walls of tube 1 and a hole obtained through the longitudinal flat portion of element 45 that is fixed to tube 1. The second rivet 51 passes through two holes defined by tube 1, one hole in the longitudinal flat portion of element 45 and a further hole defined by side 50.

Each rivet 51 consists of two elements 52 and 53. Element 52 is upset to connect the longitudinal flat portion of element 45 to a wall of tube 1, the second element 53 is subsequently interference-fitted to element 52.

Element 52 has a thread 54, accessible through the heads of the two elements 52 and 53 of the rivet. Thus it is possible to clamp the gauge by screws 55, to a support 2 in correspondence with both the upper face (as shown in FIG. 3) and also the lower face of tube 1.

Obviously, with the aid of angular brackets or similar devices, it is possible to fix the gauge even to supports that are parallel to the plane of the drawing.

Arm 49 passes through a sealing gasket 56 and a protective membrane 57.

Cable 9 passes through a threaded sleeve 58 connected with a wing 59 of element 45. A gasket 60 is placed between sleeve 58 and tube 1. A nut 61 and a counternut 62 are screwed to sleeve 58 in order to keep it in position and compress gasket 60.

Figures 5, 6, 7:
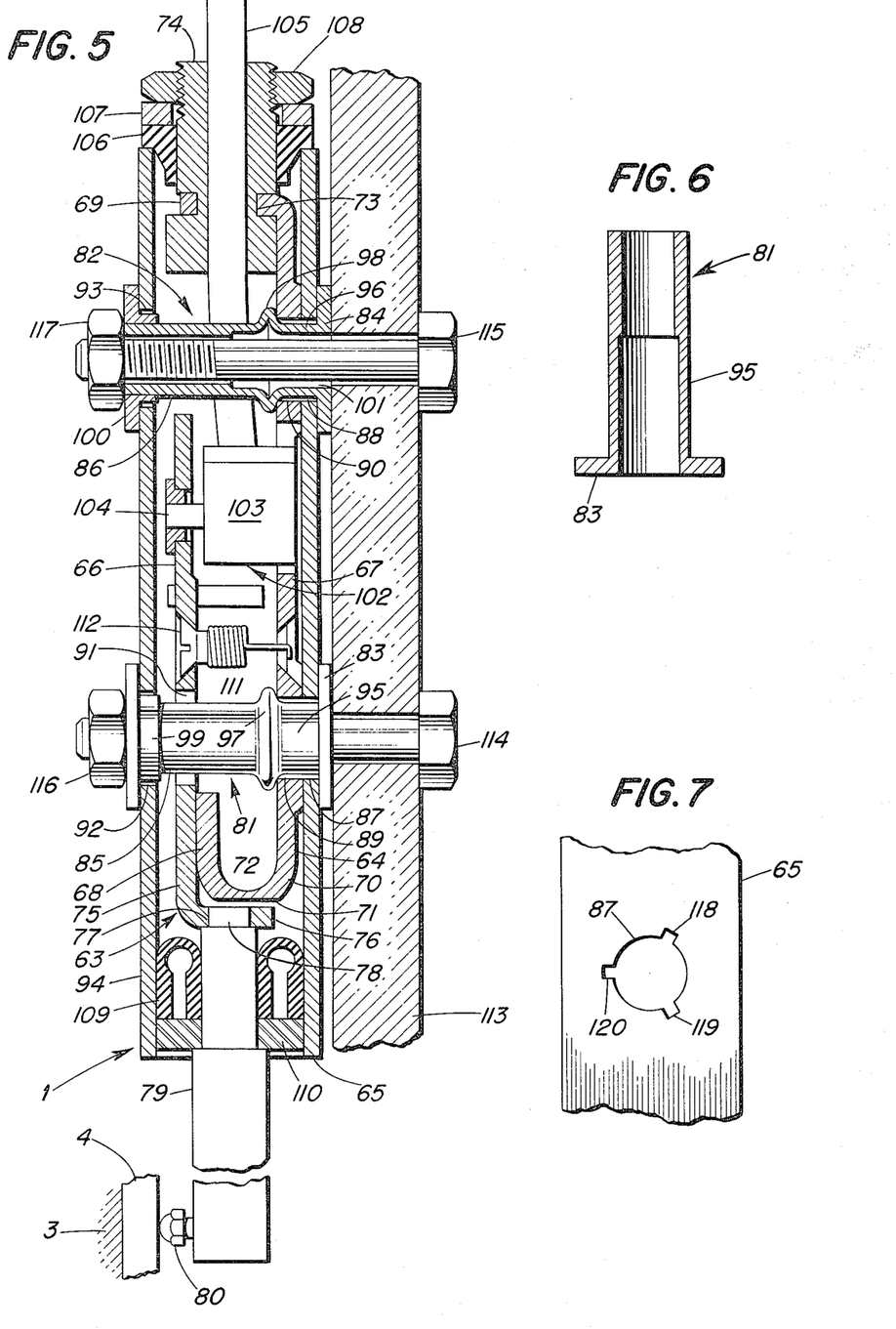
FIG. 5 is a vertical longitudinal section view of a gauge according to the preferred embodiment of the invention.
FIG. 6 is a vertical longitudinal section view of a rivet, for the connection of an armset to an external casing of the gauge, according to the shape it has before its been put into operation.
FIG. 7 shows an opening in the outer casing of the gauge shown in FIG. 5.

The gauge shown in FIG. 5 differs from that shown in FIGS. 1 to 4 substantially insofar as the different types of rivets for the armset connection are concerned and also the different way in which the gauge is fixed to the support.

Within tube 1 of the gauge shown in FIG. 5 there is arranged an armset 63 that is substantially similar to the one of the gauge shown in FIGS. 1 and 2.

Armset 63 includes a base element 64, clamped to a wall 65 of tube 1 in a way that will be described hereinafter, and an element 66 connected to element 64.

Base element 64 consists of bent sheet steel for spring and includes an intermediate portion 67, that is parallel to the longitudinal geometrical axis of tube 1, an end portion 68 bent in a direction parallel to the intermediate portion 67 and an end wing 69. The end portion 68 is connected to the intermediate one 67 through a portion 70 lightened by means of a plane chamfer 71 in such a way as to define a fulcrum 72, with a rotational axis substantially perpendicular to the longitudinal geometrical axis of the tube 1. The end portion 68 can rotate, with respect to the intermediate one 67, about fulcrum 72.

The end wing 69 extends in a direction that is substantially perpendicular to the direction of the intermediate portion 67 and it includes a lateral opening 73 to which is connected a cable clamp 74.

Element 66, which consists of bent sheet steel for spring, includes a portion 75, that is parallel to portion 68 and welded to it, and a wing 76. Wing 76, that is perpendicular to portion 75, has a hole 77 wherein there is inserted an end 78 of a gauging arm 79 that bears, at its other end, a feeler 80 adapted to touch the surface of piece 4 to be checked.

The armset 63 is connected to wall 65 by means of two rivets 81 and 82. Rivets 81 and 82, one of which, 81, is shown in FIG. 6 according to the shape it has before riveting, have annular heads 83 and 84 contacting the outer face of wall 65, and tubular stems 85 and 86 inserted through holes 87 and 88 of wall 65, holes 89,90,91 of armset 63 and holes 92 and 93 of wall 94 of tube 1 opposite to wall 65.

The tubular stems 85 and 86 have portions 95 and 96 of smaller thickness so as to be easily deformable.

Once rivets 81 and 82 have been riveted—this is achieved by compressing forces that act on the tubular stems 85 and 86 in directions that are parallel to the longitudinal geometrical axes of the rivets—the rivets have second annular heads 97 and 98 in correspondence to portions 95 and 96. The second annular heads 97 and 98 oppose movement of rivets 81 and 82 from holes 87-90 and clamp armset 63 and wall 65 one against the other preventing relative movement.

On the portions of the tubular stems 85 and 86 that protrude from wall 94 there are arranged tubular caps 99 and 100 that abut against the external face of wall 94; the caps 99, 100 can be considered as parts of rivets 81 and 82.

Between the annular heads 83 and 84 and the external face of wall 65, between the tubular caps 99 and 100 and the external face of wall 94 and between the same caps and the tubular stems 85 and 86 there is spread an epoxy two-component resin adhesive, for example "Araldit" adhesive sold on the market by the Company CIBA-GEIGY S.p.A. (Araldit is a registered trade mark), with the addition of a hardner, that has the purpose of ensuring an efficient connection of the parts to be coupled and preventing, for example, humidity from entering in the interior of tube 1 through holes 87,88,92 and 93.

"Araldit" is a resin that, after curing, becomes extremely stiff so preventing movements between the coupled parts that could affect the measurement accuracy of the gauge.

The rivets 81 and 82 thus define two through holes—only one of which, 101, is shown—that cross the tube 1 in a substantially perpendicular direction with respect to the longitudinal geometrical axis.

When the assembly has been carried out, the outer faces of annular heads 83, 84 and of tubular caps 99,100 and the ends of stems 85 and 86 are ground so that they define two plane and parallel surfaces.

The gauge shown in FIG. 5 also includes a differential-transformer position transducer 102 with a fixed part 103 coupled to the base element 64 of armset 63 and a movable part 104 coupled to portion 75 of armset 63. The fixed part 103 includes a primary winding and two secondary windings of the differential transformer while the movable part 104 includes a magnetic core that is movable with respect to the windings.

A cable 105 connects the windings of position transducer 102 to a power supply, processing and display unit not shown in the drawings. Cable 105 passes through cable clamp 74 that serves to clamp it with respect to armset 63, preventing any electrical connections between the cable and the windings of the differential transformer from being torn.

Cable clamp 74, a sealing gasket 106, a washer 107 and a nut 108, that is coupled to cable clamp 74, seal the opening of tube 1 that is adjacent to wing 69.

A gasket 109 and a flexible membrane 110 are placed between the gauging arm 79 and the internal faces of tube 1 so that the gauge is sealtight.

A spring 111, connected between the intermediate portion 67 of base element 64 and portion 75 of element 66, allows the adjustment—by means of a screw 112, accessible before armset 63 is inserted inside tube 1—of the contact force between the feeler 80 and surface of the piece 4 to be checked.

The gauge is connected to a support 113 by means of two through screws 114 and 115 that longitudinally cross tubular caps 99 and 100 and rivets 81 and 82.

As the caps 99 and 100 are coupled to stems 85 and 86 by means of "Araldit", and as the stems have a length such as that after the grinding operation their ends protrude from tube 1 in a way so as to be at the same level with the external faces of the caps (or to protrude with respect to the latter), it can be assumed with a good approximation, that the clamping forces, that screws 114 and 115, together with the associated nuts 116 and 117, and support 113, transmit to the gauge are applied mainly to rivets 81 and 82. The clamping forces act in the same direction as the forces applied for riveting the rivets, and thus they contribute in guaranteeing the safe coupling between wall 65 and armset 63.

Thus the tube 1 isn't substantially affected by the formerly mentioned clamping forces, and its main function is that of protecting the elements that are inside the gauge. The thickness of tube 1 is quite thin, for example 1 mm, so that the gauge has limited layout dimensions and is also very light.

It is obvious that rivets 81 and 82 allow the connection of the gauge to support 113 in a position which is rotated 180° with respect to that shown in FIG. 5, about the longitudinal geometrical axis of the tube 1, without having to modify the support.

During clamping of the gauge to support 113, nuts 116 and 117 touch the external faces of the annular heads 83 and 84 or the ends of the stems 85 and 86 and possibly those of the tubular caps 99 and 100 and transmit to them tangential forces that tend to make them rotate with respect to the tube 1; this tendency to rotation is opposed by the action of "Araldit" and by the interference that occurs, after riveting, between portions 95 and 96 and the surfaces of holes 87 and 88.

Should an additional safety device be necessary to prevent rivets 81 and 82 from rotating during clamping of the gauge or in case gauges are manufactured that need not be sealtight and in which, consequently, no "Araldit" is used, three slits are obtained in wall 65, spaced 120° from one another and communicating with holes 87 and 88. In FIG. 7 there are shown slits 118, 119 and 120 that are made, for example, in correspondence to hole 87. In the course of riveting of rivets 81 and 82 the portions 95 and 96 of the tubular stems 85 and 86 deform so as to occupy the above mentioned slits that prevent the rivets from rotating.

The gauge operates in the following way.

Feeler 80, by touching the surface of piece 4 of which it is required to check a linear dimension, causes a rotation of gauging arm 79 about fulcrum 72 and consequently a rotation of portion 75 about the same fulcrum. The rotation of portion 75 causes a variation in the position between the fixed part 103 and the movable part 104 of the position transducer 102 that is transformed into an electric signal responsive to the checked dimension of piece 4, or, in better terms, to the deviation of such a dimension from a known nominal value.

According to this description and to the drawings it is evident that the gauges according to this invention are particularly simple, inexpensive and not cumbersome. This is due, among the other things, to the use of rivet connections that apart from providing a cheap, ripid and handy connecting method of the armset 63 to tube 1 of the gauge, also allow clamping of the gauge to the support in different positions without requiring elements like ties or flanges or other types of expensive and cumbersome connections.

The dimensions of the gauges can be particularly small. For example, the section of tube 1 can have external 12 mm sides and internal 10 mm sides. The width of the armsets can be of 9 mm.

The gauges can be disassembled in an easy way, by breaking the rivets which clamp the armsets. Then it is possible to extract in an axial way the entire armset, including the arm and the transducer, by making them pass through an end of tube 1, and so accomplish any required repair work. Thereafter the armset is again clamped to tube 1 by applying new rivets.

A variant to the solution shown in FIG. 5 foresees the use of rivets—of a substantially identical type to that of the rivets of the gauge of FIGS. 3 and 4—with an internal portion of the tubular stems that is threaded in order to rivet the rivets by means of appropriate riveters and wherein, after riveting, the thread is removed, for example by drilling.

An advantage that is achieved by using rivets without threaded portions, or threaded rivets wherein the thread is removed after riveting, derives from the possibility of employing through screws for the connection of the gauge to the support.

If the gauge is connected to support 2 according to the position shown in FIG. 3, the screws 55 act on rivets 51 with forces that are opposite to the riveting forces applied to rivets 51 and the latter might un-rivet so causing a loose connection between element 45 of the armset and the wall of tube 1 adjacent to it.

In order to prevent the unriveting of rivets 51, it is thus advisable to use a torque wrench that guarantees clamping forces of a prefixed entity.

Even the rivets 5 of the gauge shown in FIGS. 1 and 2 might be unriveted during the clamping of the gauge to support 2 if screws 40 are used with stems that have a length such as to cause contact of these stems with the bottom of the threaded holes of the rivets and to cause a substantial lengthening of the stems of rivets 5.

The use of through screws (FIGS. 5–7) gives rise to clamping forces that are concordant to the riveting forces applied to the rivets and this guarantees, as it has been mentioned, a safer coupling of the parts joined by rivets.

The use of sheet steel elements and rivets allow mechanical processings to be reduced and simplified. Most of the necessary processings are of inexpensive type (forming, shearing, drawing, riveting, etc.).

The threaded blind hole or through hole rivets allow, as known, to accomplish the riveting of the rivets by acting from a single side of the pieces to be coupled. This feature is particularly advantageous in the gauges for checking linear dimensions of mechanical pieces, wherein often, owing to the small dimensions, the space inside the gauge is scarcely accessible; this is true, in particular, for the gauges shown in FIGS. 1 to 5, that include an external tubular casing 1 made of a single piece, open at its ends.

It is evident that the aforedescribed gauges can undergo other variants and changes equivalent from a functional and structural point of view without departing from the scope of the invention. For example, it is possible to use rivets of different types with respect to those shown.

What is claimed is:

1. A gauge for checking geometrical linear dimensions of mechanical pieces, comprising an outer casing with walls defining an internal chamber; an armset fixed to the outer casing, the armset including a movable arm and a feeler, supported by the movable arm, adapted to touch the piece to be checked; connection means to couple the gauge to an external support; and elements adapted to lock the armset to the casing and to cooperate with the connection means in order to enable the coupling of the gauge to the support.

2. The gauge according to claim 1, wherein the elements include a rivet.

3. The gauge according to claim 2, wherein the armset includes a section adjacent to an internal face of said casing, fulcrum means associated with said section and means for connecting the arm to the fulcrum means, said rivet coupling the section to a wall of the casing.

4. The gauge according to claim 3, wherein said rivet has a blind hole and passes through just one wall of the casing.

5. The gauge according to claim 3, or claim 4, wherein said rivet is threaded.

6. The gauge according to claim 1, wherein said elements include a substantially tubular device passing through the casing and coupled to the casing, and the connection means include a clamping device passing through the casing; the clamping device being adapted to act on the support to make the support cooperate with a first end portion of the substantially tubular device in order to apply to it a first clamping force for clamping the gauge to the support; the clamping device being adapted to apply a second clamping force on a second end portion of the substantially tubular device, opposite to said first portion.

7. The gauge according to claim 6, wherein said substantially tubular device includes a tubular rivet and the casing defines opposite holes, adapted to be coupled with the rivet.

8. The gauge according to claim 7, wherein the tubular rivet defines a head that externally cooperates with the casing and a stem passing through the casing, the stem having a part housed within the casing and an end part that is substantially external to the casing; the head and the end part of the stem being adapted to define said first and second portion of the substantially tubular device.

9. The gauge according to claim 3, wherein said casing defines opposite holes and the rivet has a through hole, a head external to the casing and a stem, passing through said holes of the casing, with a threaded portion; the connection means including a screw adapted to cooperate with the support and with the threaded portion in order to enable the coupling of the gauge to the support.

10. The gauge according to claim 8, wherein said armset defines an opening, substantially aligned with the holes of the external casing, for the passage of the stem, the rivet having, in correspondence to an intermediate portion of the stem, a second head cooperating with a portion of the armset adjacent to said opening; the first and the second heads of the rivet being adapted to lock the armset to the casing.

11. The gauge according to claim 8, wherein said clamping device includes a through screw, for clearance fit with the hole of the tubular rivet, and a nut associated with the screw.

12. The gauge according to claim 8 or claim 11, wherein the head of the rivet and the part of the stem that is external to the casing define two plane and parallel surfaces, one opposite the other, adapted to enable the coupling of the gauge to the support in two substantially opposite positions.

13. The gauge according to claim 4, further comprising sealing elements placed between said rivet and said casing.

14. The gauge according to claim 12, further comprising a layer of epoxy adhesive placed between the rivet and the outer casing in order to define rigid seals.

15. The gauge according to claim 14, wherein said layer of epoxy adhesive is adapted to prevent the rivet from rotating with respect to the outer casing.

16. The gauge according to claim 14 wherein said outer casing defines—in correspondence to the rivet—slits adapted to cooperate with the rivet in order to prevent it from rotating with respect to the outer casing.

17. The gauge according to claim 16 wherein the slits are three and they define longitudinal axes placed 120° apart.

18. The gauge according to one of claims 2 to 4, 7–11 or 13, further comprising an additional rivet to lock the armset to the casing and to allow coupling of the gauge to the support.

19. The gauge according to claim 18, wherein after unlocking of said rivet and additional rivet, the armset can be extracted in an axial direction through the casing.

20. The gauge according to one of claims 1–4, 4–11 or 13, wherein the outer casing has a tubular structural shape with a cross-section that has a substantially square perimeter.

* * * * *

UNITED STATES PATENT AND TRADEMARK OFFICE
CERTIFICATE OF CORRECTION

PATENT NO. : 4,356,634
DATED : November 2, 1982
INVENTOR(S) : Mario POSSATI

It is certified that error appears in the above—identified patent and that said Letters Patent is hereby corrected as shown below:

```
Column 1, line 15 change "layour" to --layout--
Column 1, line 23 after "reduction" insert --of--
Column 1, line 59 change "its" to --it's--
Column 6, line 57 change "ripid" to --rapid--
Claim 20, line 1, change "4-11" to --7-11--.
```

Signed and Sealed this

Eighth Day of February 1983

[SEAL]

Attest:

GERALD J MOSSINGHOFF

Attesting Officer   Commissioner of Patents and Trademarks

UNITED STATES PATENT AND TRADEMARK OFFICE
CERTIFICATE OF CORRECTION

PATENT NO. : 4,356,634
DATED : November 2, 1982
INVENTOR(S) : Mario Possati

It is certified that error appears in the above-identified patent and that said Letters Patent is hereby corrected as shown below:

On the title page Insert

-- (73) Assignee: Finike Italinana Marposs S.P.A.
S. Marino (BO) Italy --.

Signed and Sealed this

Sixth Day of December 1983

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,356,634
DATED : November 2, 1982
INVENTOR(S) : Mario Possati

It is certified that error appears in the above-identified patent and that said Letters Patent is hereby corrected as shown below:

On the title page insert

--(73) Assignee:  Finike Italiana Marposs S.P.A.
                  Bentivoglio- S. Marino (BO) Italy--.

This certificate supersedes certificate of correction issued December 6, 1983.

Signed and Sealed this

Third Day of April 1984

[SEAL]

Attest:

Attesting Officer

GERALD J. MOSSINGHOFF

Commissioner of Patents and Trademarks